United States Patent
Parks

(10) Patent No.: US 10,766,614 B2
(45) Date of Patent: *Sep. 8, 2020

(54) METHOD AND SYSTEM FOR IMPROVING TRANSITION LIFT-FAN PERFORMANCE

(71) Applicant: Aurora Flight Sciences Corporation, Manassas, VA (US)

(72) Inventor: Robert Parks, San Jose, CA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,174

(22) Filed: Sep. 23, 2019

(65) Prior Publication Data

US 2020/0164974 A1    May 28, 2020

Related U.S. Application Data

(63) Continuation of application No. 13/311,295, filed on Dec. 5, 2011, now Pat. No. 10,427,784.

(51) Int. Cl.
*B64C 29/00* (2006.01)
*G05D 1/10* (2006.01)
*B64C 11/30* (2006.01)
*B64D 27/24* (2006.01)

(52) U.S. Cl.
CPC ......... *B64C 29/0016* (2013.01); *B64C 11/30* (2013.01); *B64C 29/0025* (2013.01); *B64C 29/0083* (2013.01); *B64C 29/0091* (2013.01); *B64D 27/24* (2013.01); *G05D 1/102* (2013.01)

(58) Field of Classification Search
CPC ............ B64C 29/0016; B64C 29/0025; B64C 29/0083
See application file for complete search history.

(56) References Cited

U.S. PATENT DOCUMENTS

| | | |
|---|---|---|
| 2,968,452 A | 1/1961 | Cook |
| 3,056,565 A | 10/1962 | Griffith |
| 3,110,456 A | 11/1963 | Creasey et al. |
| 3,291,236 A | 12/1966 | Foshag et al. |
| 3,388,878 A | 6/1968 | Peterson et al. |
| 3,599,901 A | 8/1971 | Relkin |

(Continued)

FOREIGN PATENT DOCUMENTS

| | | |
|---|---|---|
| DE | 19950723 A1 | 5/2001 |
| GB | 886111 A | 1/1962 |

(Continued)

OTHER PUBLICATIONS

Birckelbaw et al., Aerodynamics Model for a Generic ASTOVL Lift-Fan Aircraft (NASA Technical Memorandum 110347), Apr. 1995.

(Continued)

*Primary Examiner* — Richard R. Green
*Assistant Examiner* — Michael A. Fabula
(74) *Attorney, Agent, or Firm* — Michael Stanley Tomsa; McAndrews, Held & Malloy, Ltd.; Eugene H. Nahm

(57) ABSTRACT

A system and method enabled to increase efficiency during a VTOL aircraft's transition. A VTOL aircraft enabled to operate multiple lift fans arranged into separately controllable groups, wherein the VTOL aircraft initially has vertical flight but transitions to horizontal flight. A first group of lift fans may be kept at full throttle, a second group of lift fans may be throttled to balance thrust and/or weight, and a third group of lift fans may be shut off.

20 Claims, 10 Drawing Sheets

(56) References Cited

U.S. PATENT DOCUMENTS

| | | |
|---|---|---|
| 3,618,875 A | 11/1971 | Kappus |
| 4,022,405 A | 5/1977 | Peterson |
| 4,795,111 A | 1/1989 | Moller |
| 4,828,203 A | 5/1989 | Clifton et al. |
| 5,115,996 A | 5/1992 | Moller |
| 5,351,911 A | 10/1994 | Neumayr |
| 5,890,441 A | 4/1999 | Swinson et al. |
| 6,254,032 B1 | 7/2001 | Bucher |
| 6,464,166 B1 | 10/2002 | Yoeli |
| 6,561,456 B1 | 5/2003 | Devine |
| 6,817,570 B2 | 11/2004 | Yoeli |
| 6,843,447 B2 | 1/2005 | Morgan |
| 6,848,649 B2 | 2/2005 | Churchman |
| 6,886,776 B2 | 5/2005 | Wagner et al. |
| 6,974,106 B2 | 12/2005 | Churchman |
| 7,032,861 B2 | 4/2006 | Sanders, Jr. et al. |
| 7,149,611 B2 | 12/2006 | Beck et al. |
| 7,789,342 B2 | 9/2010 | Yoeli |
| 7,857,254 B2 | 12/2010 | Parks |
| 7,866,598 B2 | 1/2011 | Waide et al. |
| 8,020,803 B2 | 9/2011 | Waide et al. |
| 8,038,091 B2 | 10/2011 | Ishiba |
| 8,453,962 B2 | 6/2013 | Shaw |
| 8,590,288 B2 | 11/2013 | Ishiba |
| 8,636,241 B2 | 1/2014 | Lugg et al. |
| 8,708,273 B2 | 4/2014 | Oliver |
| 8,725,314 B2 | 5/2014 | Chaperon et al. |
| 8,733,690 B2 | 5/2014 | Bevirt et al. |
| 9,004,973 B2 | 4/2015 | Condon et al. |
| 9,277,130 B2 | 3/2016 | Wang et al. |
| 2003/0038213 A1 | 2/2003 | Yoeli |
| 2003/0062443 A1 | 4/2003 | Wagner et al. |
| 2004/0094662 A1 | 5/2004 | Sanders, Jr. et al. |
| 2004/0149857 A1 | 8/2004 | Yoeli |
| 2004/0245374 A1 | 12/2004 | Morgan |
| 2006/0144994 A1 | 7/2006 | Spirov et al. |
| 2006/0151666 A1 | 7/2006 | VanderMey et al. |
| 2007/0034734 A1 | 2/2007 | Yoeli |
| 2007/0034739 A1 | 2/2007 | Yoeli |
| 2007/0057113 A1 | 3/2007 | Parks |
| 2007/0246601 A1 | 10/2007 | Layton |
| 2008/0054121 A1 | 3/2008 | Yoeli |
| 2008/0142643 A1 | 6/2008 | Yoeli |
| 2008/0223993 A1 | 9/2008 | Spirov et al. |
| 2008/0283673 A1 | 11/2008 | Yoeli |
| 2009/0127379 A1 | 5/2009 | Lugg |
| 2009/0159757 A1 | 6/2009 | Yoeli |
| 2010/0051753 A1 | 3/2010 | Yoeli |
| 2010/0076625 A1 | 3/2010 | Yoeli |
| 2011/0001001 A1 | 1/2011 | Bryant |
| 2011/0042508 A1 | 2/2011 | Bevirt |
| 2011/0042509 A1 | 2/2011 | Bevirt |
| 2011/0042510 A1 | 2/2011 | Bevirt et al. |
| 2011/0168835 A1 | 7/2011 | Oliver |
| 2011/0174920 A1 | 7/2011 | Yoeli |
| 2011/0204187 A1 | 8/2011 | Spirov |
| 2011/0301787 A1 | 12/2011 | Chaperon et al. |
| 2011/0303795 A1 | 12/2011 | Oliver |
| 2011/0315809 A1 | 12/2011 | Oliver |
| 2012/0056040 A1 | 3/2012 | Brotherton-Ratcliffe et al. |
| 2013/0062455 A1 | 3/2013 | Lugg et al. |
| 2013/0068876 A1 | 3/2013 | Radu |
| 2013/0112804 A1 | 5/2013 | Zhu |

FOREIGN PATENT DOCUMENTS

| | | |
|---|---|---|
| GB | 2468787 A | 9/2010 |
| WO | 2006/113877 A2 | 10/2006 |
| WO | 2015/028627 A1 | 3/2015 |

OTHER PUBLICATIONS

W. B. Fenwick, XV5A Aircraft Flight Tests Landing Strip Evaluations (Miscellaneous Paper No. 4-844), sponsored by the U.S. Army Materials Laboratories and conducted by the U.S. Army Waterways Experiment D Station, Corps of Engineers, Sep. 1966.

Gerdes, Ronald M. (SYRE; NASA, Ames Research Center, Moffett Field, CAI, Lift-fan aircraft—Lessons learned from XV-5 flight experience, AIAA-1993-4838 IN:AIAA International Powered Lift Conference, Santa Clara, CA, Dec. 1-3, 1993, Technical Papers (A94-16426 Feb. 2005), Washington, American Institute of Aeronautics and Astronautics, p. 94 (1993).

William W. Y. Chung, Paul F. Borchers, and James A. Franklin, Moving Base Simulation of an ASTOVL Lift-Fan Aircraft (NASA Technical Memorandum 110365), Aug. 1995.

GE-Ryan XV-5A, retrieved from <http://www.vstol.org NSTOLWheel/GE-RyanXV-5A.htm> on Apr. 23, 2011.

International Search Report for International Patent Application No. PCT/US2012/067783 dated Aug. 8, 2013.

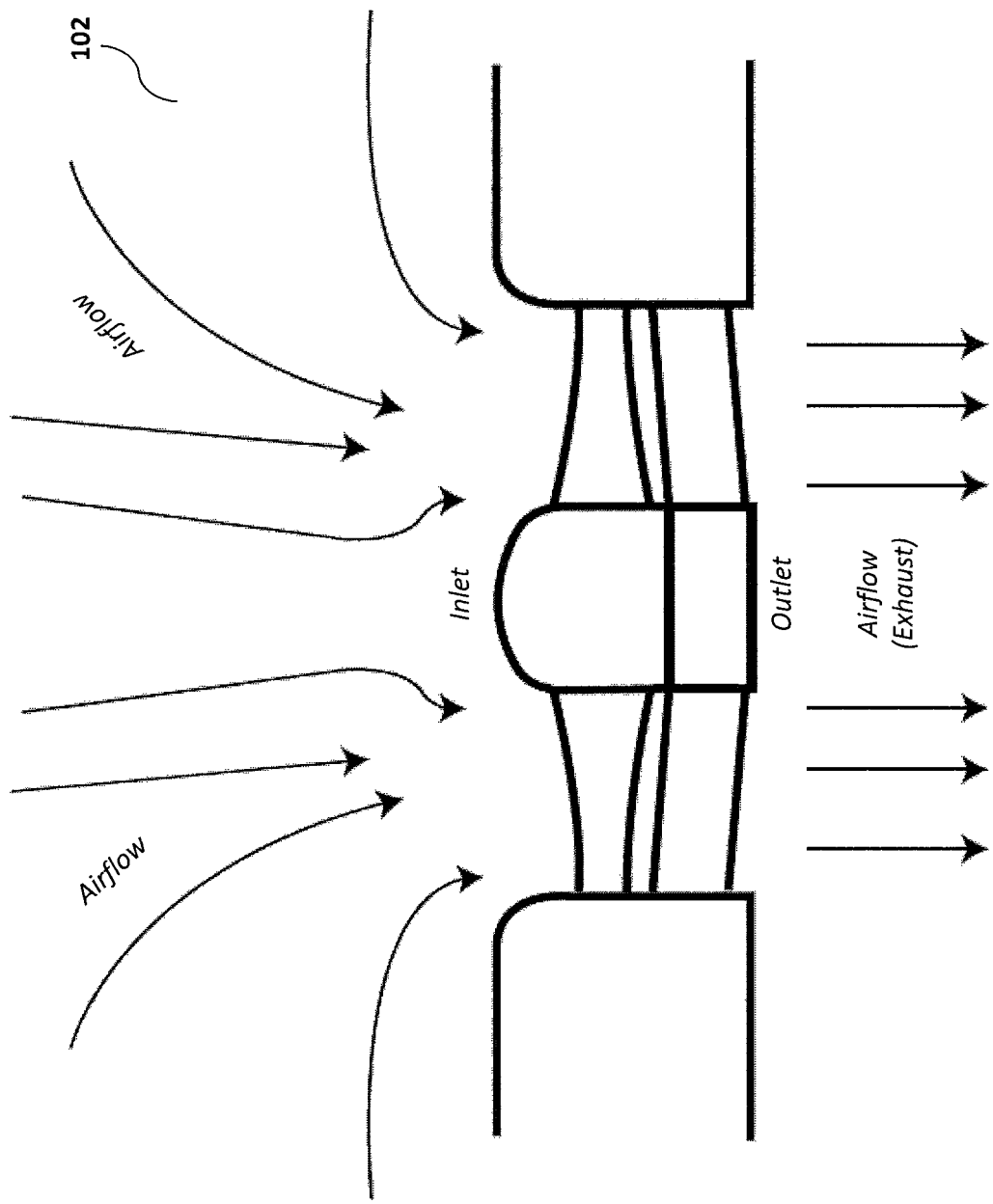

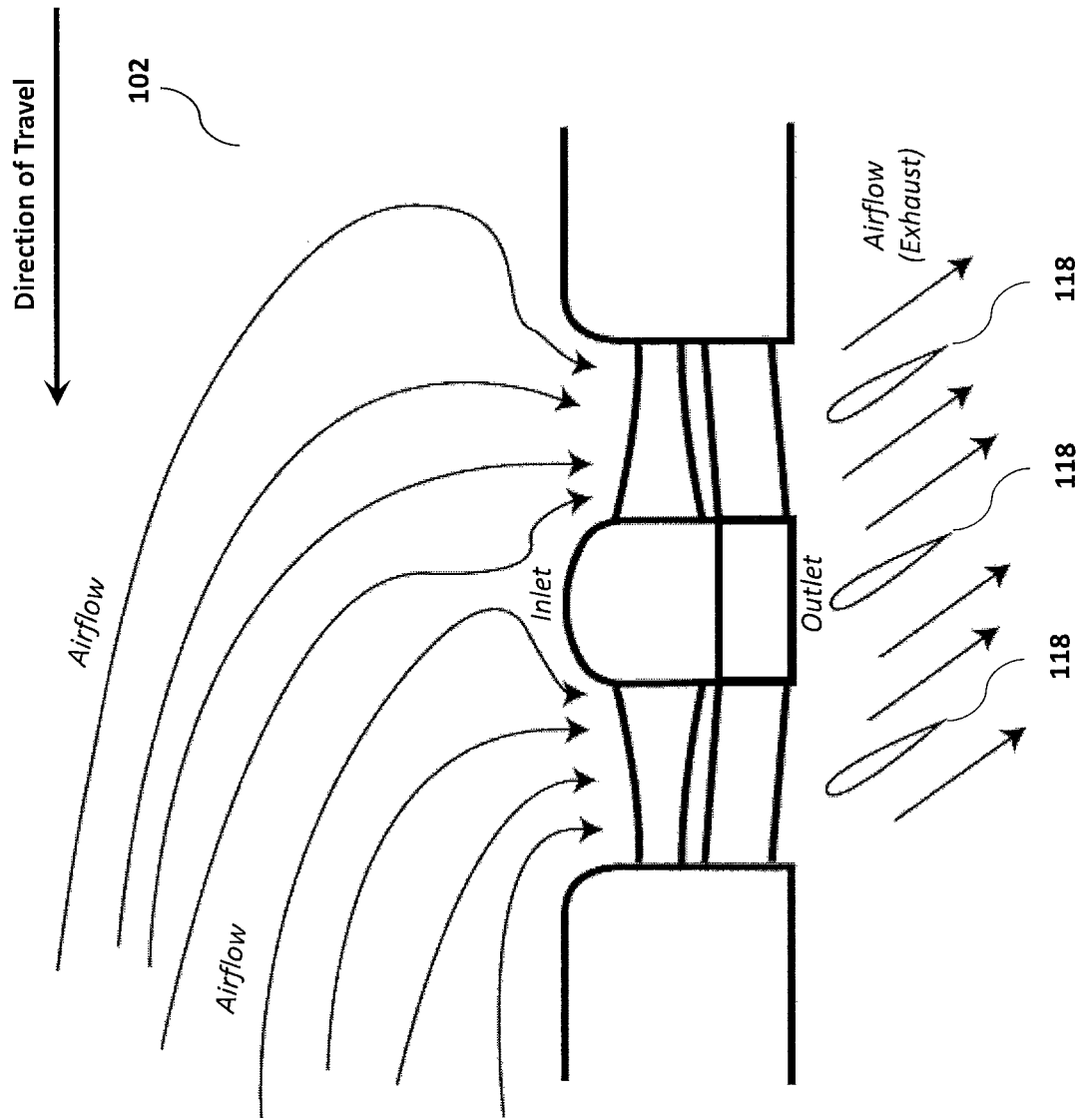

METHOD AND SYSTEM FOR IMPROVING TRANSITION LIFT-FAN PERFORMANCE

CROSS REFERENCE

This application is a continuation of commonly owned U.S. patent application Ser. No. 13/311,295, filed on Dec. 5, 2011, by Robert Parks, which is hereby incorporated by reference.

FIELD

The present disclosure relates to a system and method for use with a lift-fan aircraft. Specifically, the present disclosure relates to systems and methods for reducing power consumption and momentum drag in a lift-fan aircraft.

BACKGROUND

Over the years, gas turbine-powered aircraft have used a variety of configurations to achieve vertical and/or short take-off and landing (V/STOL). One method is to vector the engine exhaust from one or more turbojet engines downward to create lift. Once airborne, this type of aircraft gradually transitions the thrust from downward to aft until a forward airspeed sufficient to support wing-borne flight of the aircraft is achieved, at which point conventional aerodynamics may take over. Other configurations use remotely located lifting fans powered by compressor stage bleed air from the turbojet engines to create lift. Alternatively, a ducted mixture of compressor bleed air and turbojet exhaust gas may be ducted to remotely located nozzles that discharge a downward thrust, thereby creating reaction-lifting forces that lift and control the aircraft. While these configurations often use very high disc loading fans, they are still more efficient than pure jet variants.

An exemplary high disc loading lift-fan aircraft is the Ryan XV-5, which was developed during the 1960s and flown successfully in 1968. The XV-5 used a pair of General Electric J-85 turbojet engines and three lift fans to provide controlled flight. Specifically, installed in each wing is a 62.5-inch diameter fan configured to provide collectively a majority of the vertical thrust, with a smaller fan in the nose to provide lift and pitch trim. For vertical liftoff, jet-engine exhaust is diverted to drive the lift-fan tip turbines via a diverter valve. The core engines provided a total thrust of 5,300 pounds in forward flight mode, but could generate a total lift thrust of 16,000 pounds via the lift fans in hover mode. Using the lift fans provides a 200% increase in the total thrust, a clearly advantageous feature for vertical takeoff and landing ("VTOL") aircraft.

Unfortunately, a disadvantage associated with ducted lift-fan aircraft is momentum drag, which causes an aircraft to require much higher power levels. Momentum drag is generally caused by a directional change of the airflow going through the lift fans. For instance, the lift fan airflow initially has horizontal momentum (relative to the aircraft and due to the forward speed of the aircraft), but exits vertically, with no relative horizontal momentum. This change in momentum results in a horizontal force towards the back of the aircraft (i.e., momentum drag), which has an effect similar to normal aerodynamic drag. This momentum drag is a function of the mass flow rate of air through the lift fans times the forward speed of the aircraft through the air. Often the goal of lift-fan aircraft design is to increase the mass flow of air by using larger diameter fans with a smaller lift per unit area. This reduces the power needed to produce the required lift; however, the associated higher mass flow can greatly increase the momentum drag. As momentum drag can become quite large, forward flight thrusters require a large amount of power to enable the aircraft to accelerate fully to wing-borne flight.

Therefore, a need exists for a system and method to both increase efficiency and reduce the momentum drag. More specifically, a need exists for a system and method for increasing efficiency and reducing the momentum drag of a light or low disc loading lift-fan aircraft, such that its peak power requirements are not increased greatly from its hover power requirements.

SUMMARY

The present application discloses a system and method for increasing efficiency and reducing the momentum drag of a low disc loading lift-fan aircraft, such that its peak power requirements are not greatly increased from its hover power requirements.

According to a first aspect, a method of operating a propulsion system in a VTOL aircraft includes controlling a forward thrust propulsion system to generate a forward thrust during a transition from vertical flight to forward flight; selectively allocating, during the transition from vertical flight to forward flight, each of a plurality of ducted lift fans into a first operation group configured to operate at substantially full throttle, a second operation group configured to operate at intermediate throttle, or a third operation group configured to operate at substantially zero throttle; and selectively reallocating, during the transition from vertical flight to forward flight, one or more of the plurality of ducted lift fans from one of the first operation group, the second operation group, or the third operation group to a different one of the first operation group, the second operation group, or the third operation group to generate a second desired total thrust, where each of the plurality of ducted lift fans is configured to be controlled independently and has an axis of rotation that is fixed and substantially vertical; the first operation group, the second operation group, and the third operation group are configured to generate, in aggregate, a first desired total thrust.

According to a second aspect, a system for operating a VTOL aircraft includes a forward propulsion system; a plurality of ducted lift fans; and a controller. The controller is configured to control the forward thrust propulsion system to generate a forward thrust during a transition from vertical flight to forward flight; selectively allocate, during the transition from vertical flight to forward flight, each of the plurality of ducted lift fans into a first operation group configured to operate at substantially full throttle, a second operation group configured to operate at intermediate throttle, or a third operation group configured to operate at substantially zero throttle, selectively reallocate, during the transition from vertical flight to forward flight, one or more of the plurality of ducted lift fans from one of the first operation group, the second operation group, or the third operation group to a different one of the first operation group, the second operation group, or the third operation group to generate a second desired total thrust; control the forward thrust propulsion system to generate a forward thrust during forward flight; and allocate each of the plurality of ducted lift fans to the third operation group during forward flight, where each of the plurality of ducted lift fans is configured to be controlled independently and has an axis of rotation that is fixed and substantially vertical; the first operation group, the second operation group, and the third operation group are configured to generate, in aggregate, a first desired total thrust, and a minority of the plurality of ducted lift fans are maintained in the second operation group relative to the first operation group and the third operation group during the transition from vertical flight to forward flight.

In certain aspects, a minority of the plurality of ducted lift fans are maintained in the second operation group relative to the first operation group and the third operation group during the transition from vertical flight to forward flight.

In certain aspects, the second operation group is configured to operate at intermediate throttle by varying a rotation per minute (RPM) of one or more of the ducted lift fans of the second operation group; varying a pitch of one or more of the ducted lift fans of the second operation group; or a combination thereof. Such throttling may also be used, for example, to trim the aircraft's pitch and roll.

In some aspects, the inactive lift fans may be covered after being shut down to decrease aerodynamic drag on the VTOL aircraft.

In certain aspects, at least one of the plurality of lift fans may have adjustable vanes to direct the lift fan exhaust flow aft, thereby providing thrust and reducing drag.

In certain aspects, the plurality of lift fans may comprise six or more lift fans.

In certain aspects, the VTOL aircraft uses a hybrid of turbine and electric thrusting.

DRAWINGS

The foregoing and other objects, features, and advantages of the devices, systems, and methods described herein will be apparent from the following description of particular embodiments thereof, as illustrated in the accompanying figures; where like reference numbers refer to like structures. The figures are not necessarily to scale, emphasis instead being placed upon illustrating the principles of the devices, systems, and methods described herein.

FIGS. 3a through 3c illustrate typical airflow patterns around a lift fan, such as a lift fan of the aircraft shown in FIG. 2.

DESCRIPTION

Embodiments of the present disclosure will be described hereinbelow with reference to the accompanying drawings. In the following description, well-known functions or constructions are not described in detail because they would obscure the invention in unnecessary detail. The present disclosure discloses a system and method for increasing efficiency and reducing the momentum drag of a low disc loading lift-fan aircraft, such that its peak power requirements are not greatly increased from its hover power requirements.

Lift fans are commonly used in VTOL aircraft, which can include both fixed-wing aircraft and non-fixed-wing aircraft. However, lift fans can enable VTOL aircraft to operate in other modes as well, including, for example, CTOL (conventional takeoff and landing), STOL (short takeoff and landing), and/or V/STOL (vertical and/or short take-off and landing).

Figure 1A:
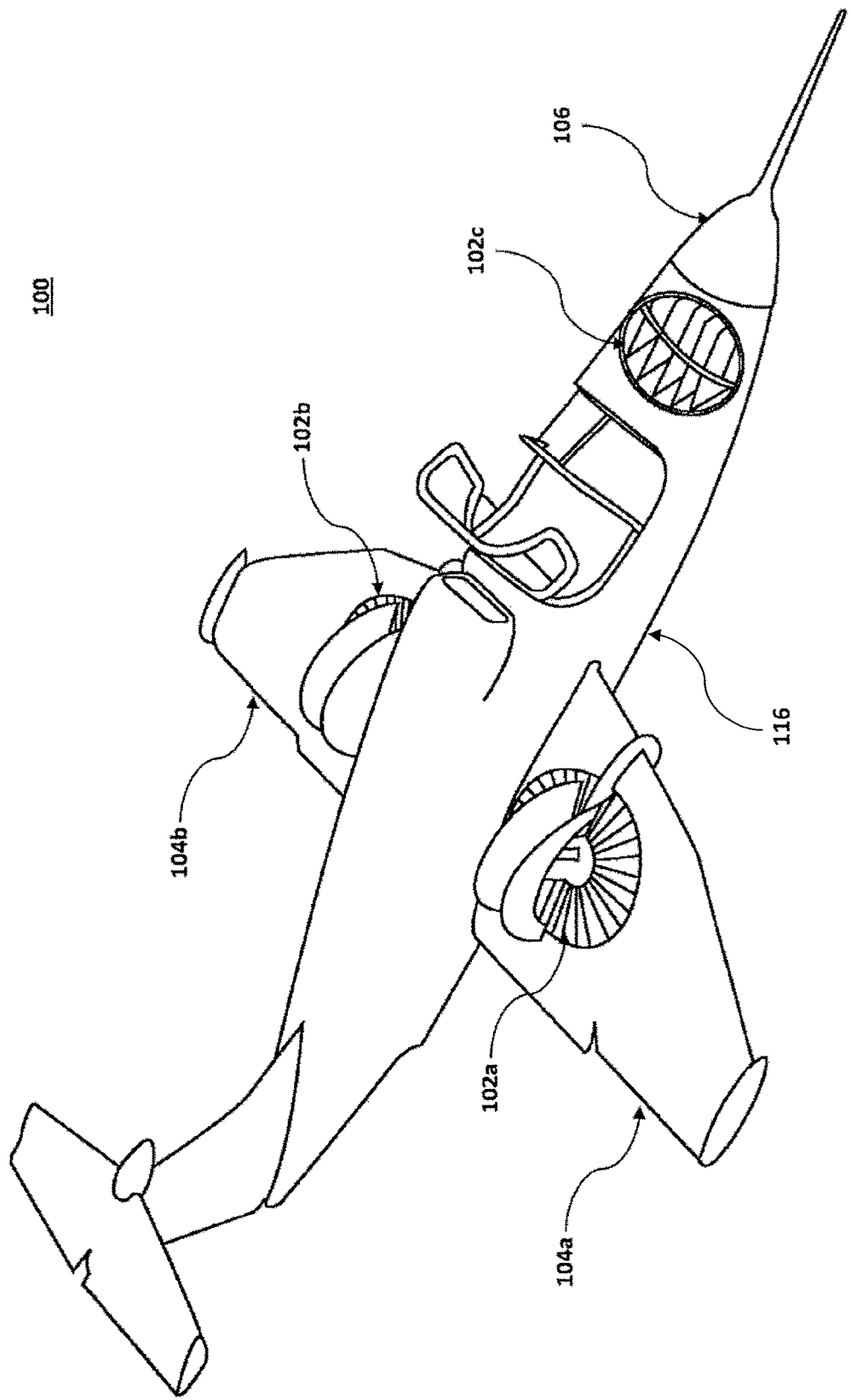
FIG. 1a illustrates an XV-5 lift-fan aircraft.
Figure 1B:
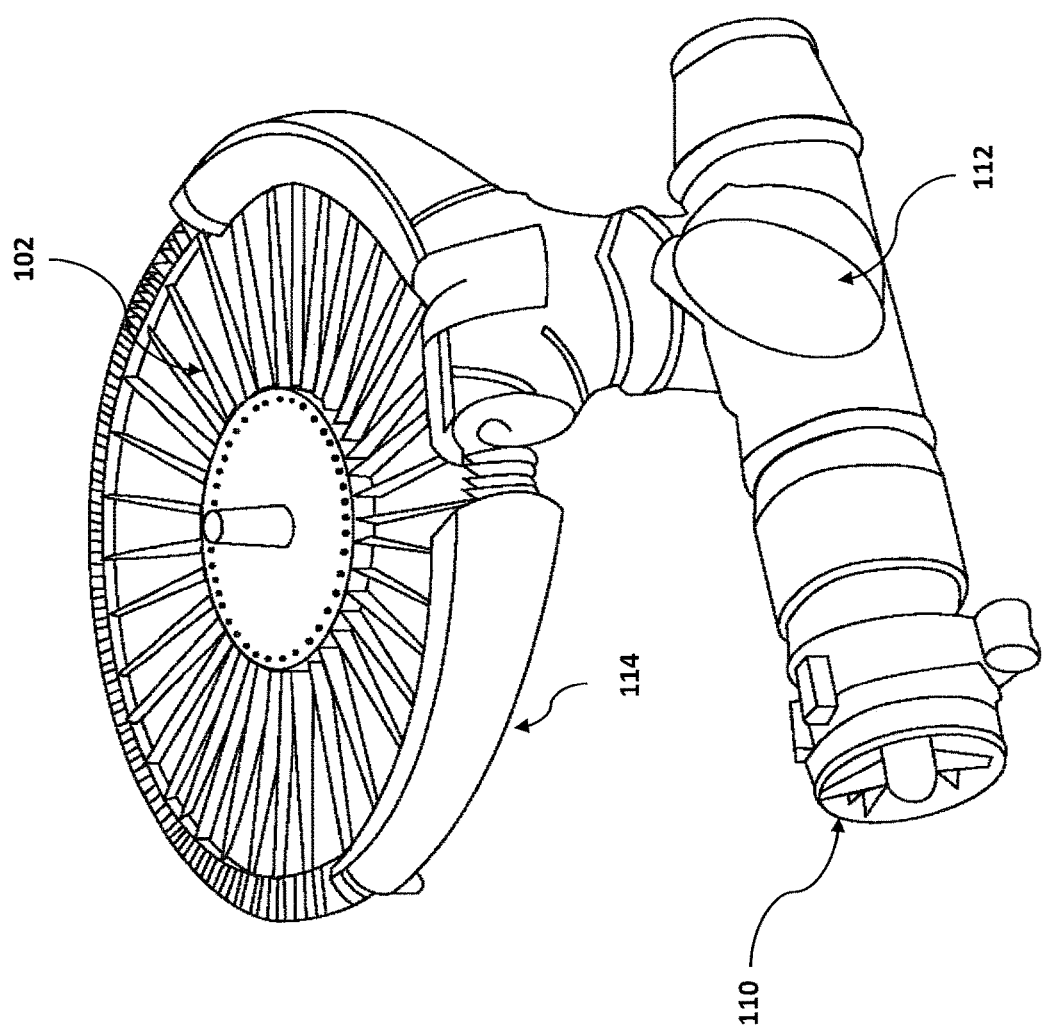
FIG. 1b illustrates the engine and lift fan of the XV-5 lift-fan aircraft.

An example of an early lift-fan aircraft is the Ryan XV-5 (a/k/a XV-5a and XV-5b), which was developed during the 1960's and flown successfully in 1968. As depicted in FIGS. 1a and 1b, the XV-5 100 used a pair of General Electric J-85 turbojet engines 110 (see FIG. 1b) and three lift fans 102a, 102b, 102c to sustain controlled flight. Specifically, installed in each wing 104a, 104b was a 62.5-inch diameter fan 102a, 102b configured to provide the majority of the vertical thrust, with a smaller 36-inch diameter fan 102c in the nose 106 to provide some lift as well as pitch trim. Each wing fan 104a, 104b has a disc area of approximately 21 square feet with a thrust of approximately 6,800 pounds, yielding a high disc loading (thrust divided by disc area) of approximately 320 pounds per square foot.

A safety feature of the gas-driven XV-5 lift-fan concept 100 was the robustness of the lift fans 102a, 102b, 102c. The absence of drive shafts, shaft bearings, gearboxes, and the attendant-pressure-lubrication systems resulted in relatively low maintenance and high pilot confidence. In fact, the only on-board indicators associated with the three lift fans 102a, 102b, 102c installed in the XV-5 100 were rotations per minute (RPM) and fan cavity temperature. Pilot monitoring of fan machinery health was thus reduced to a minimum, which was highly desirable for a single-piloted aircraft. Such lift fans have also proven to be highly resistant to ingestion of foreign objects, which is a positive factor for remote site operations.

As seen in FIG. 1b, to operate the XV-5 100 lift fans 102, exhaust from the jet engines 110 is diverted via a diverter valve 112 via tip turbines 114. The core engines 110 provide a total thrust of 5,300 pounds in forward flight mode but can yield a total lift thrust of 16,000 pounds via the lift fans 102a, 102b, 102c in hover mode. This provides a 200% increase in the total thrust, a clear advantage for a VTOL aircraft.

Another lift-fan aircraft is disclosed by U.S. Pat. No. 4,022,405 to John M. Peterson entitled "Fan Lift-Cruise V/STOL Aircraft" (the "'405 patent"). The '405 patent discloses an aircraft for making vertical and short field takeoffs powered by a bypass turbofan engine having a core turbojet and a bypass fan. For vertical takeoffs, the efflux from the bypass fan is deflected downward to create lift. Exhaust from the core turbojet is ducted to turbine-driven lifting fans at remote locations to create supplemental lifting forces, which also provides aircraft control and stability. For cruise, the bypass fan efflux is discharged aft until sufficient forward airspeed is attained that exhaust gas flow to the lifting fans may be shut off, and then exhaust gas flow may be discharged aft. The '405 patent also discloses a number of suitable lift-fan throttling and vane controller methods that may be used in conjunction with the present application.

However, more recently, the design trend has been to move away from these configurations by decreasing disc loading, thereby reducing peak power. An added benefit of this new configuration is that the resulting reduced downwash speed also minimizes ground erosion. In addition, multiple fans may be used to allow redundancy in case of a lift-fan failure.

In certain aspects, lift fans may be modular units with integrated electric power where stored electric power may be used to handle the very high power burst needed for takeoff, without increasing the size of the main cruise jet engines. This configuration may promote greater efficiency. For instance, an aircraft may store the required takeoff power in the form of a primarily electric fan engine, and secondarily in the form of an internal combustion engine. As a result, the combined power of the electric fan and internal combustion engines may cause the VTOL aircraft to take off using substantially less time and space as compared to other VTOL aircraft. In addition, using a hybrid configuration, the transition from vertical to horizontal thrust may be carefully executed to rise rapidly from the takeoff position to a forward flight position, thereby minimizing the necessity for a larger electric fan engine.

For further information on hybrid turbine electric thrusting techniques, see, for example, commonly owned U.S. Pat. No. 7,857,254 ("'254 patent") to Robert Parks, entitled "System and Method For Utilizing Stored Electrical Energy for VTOL Aircraft Thrust Enhancement and Attitude Control." The '254 patent also discloses a suitable programmable controller for controlling, inter alia, a plurality of electrically-driven fans in an aircraft. Specifically, the '254 patent explains that the aircraft control systems, and any and all components thereof (e.g., a main flight control computer, attitude control circuit, and/or thrust control circuit, among other components) can employ any suitable type of processor and memory, which can be programmed using conventional techniques known to those having ordinary skill in the art of computer programming (whether in actual source code or object code). The processor and memory can be used, for example, to perform some or all of the functions of the aircraft control systems.

Figure 2:
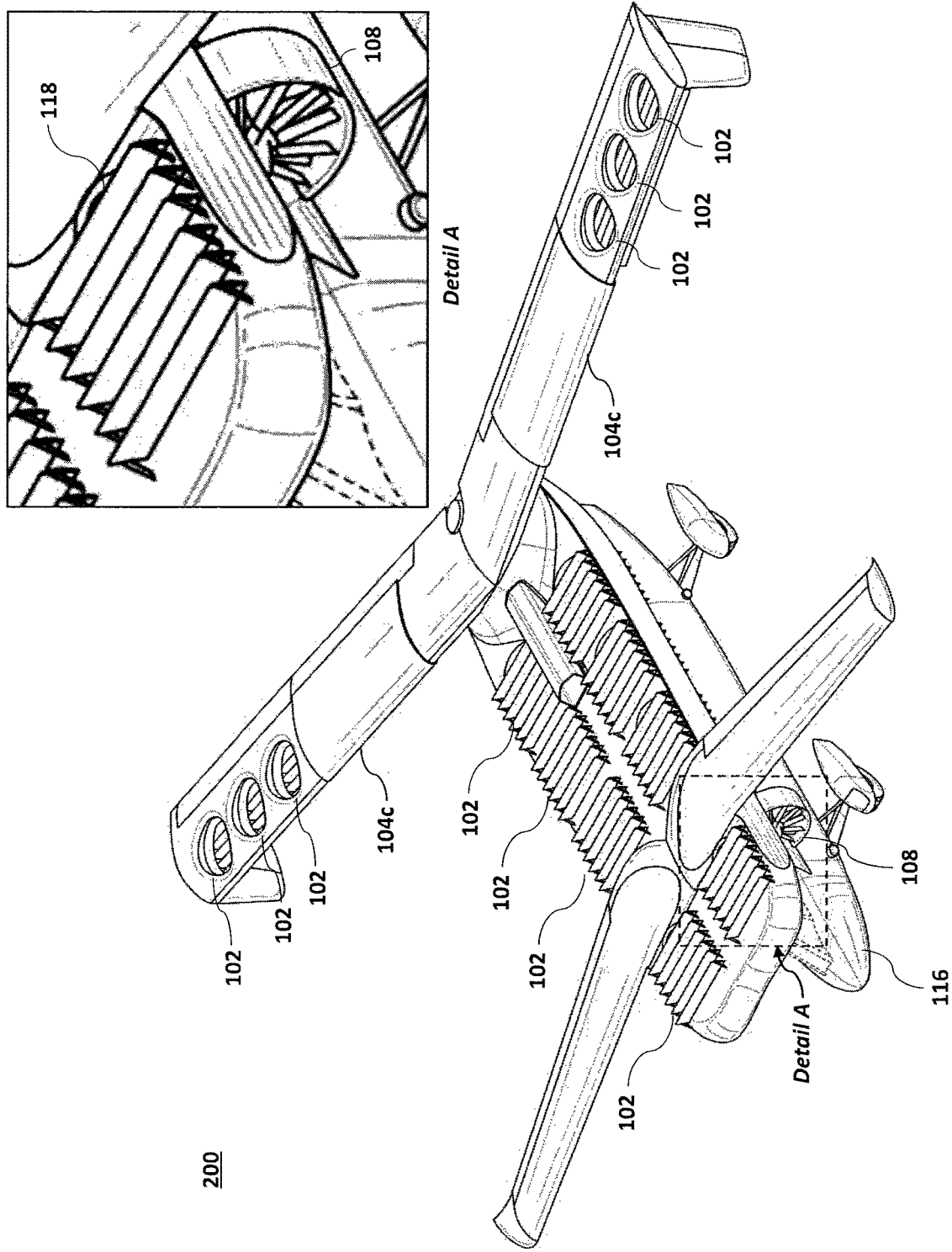
FIG. 2 illustrates an exemplary contemporary lift-fan aircraft having multiple low disc loading fans.

Due to scaling laws for fans and motors, employing multiple smaller fans can be lighter than using fewer large fans to provide the same total thrust. In addition, multiple smaller fans also provide more flexibility to the configuration designer. For example, as seen in FIG. 2, an aircraft 200 may employ a forward thrust propulsion system 108 and multiple smaller lift fans 102 may be used to create a vertical takeoff vehicle. As illustrated, a forward thrust propulsion system 108 may be positioned on each side of the fuselage 116 and oriented to direct thrust toward the aft end, thereby resulting in forward thrust for the aircraft 200. FIG. 2 also illustrates an arrangement of multiple smaller lift fans 102 to provide vertical thrust. Specifically, three lift fans 102 are positioned near the distal end of each of the two aft wings 104c and eight lift fans 102 are positioned above the fuselage 116 (and arranged to provide vertical thrust straddling each side of the fuselage 116). As illustrated in Detail A of FIG. 2, each of the lift fans 102 may employ adjustable vanes 118 (e.g., on the top and/or bottom of the lift fans 102) to direct airflow in and/or out of the lift fans 102 (e.g., during operation). The vanes 118 may be fully shut to reduce drag during forward flight when the lift fans 102 are not in operation. As noted above, using multiple smaller fans permits redundancy, thereby providing backup fans in the event of one or more fan malfunctions. Nevertheless, momentum drag can remain an issue when ducted lift fans are used.

To better understand momentum drag, basic lift-fan operation and its associated physics will now be described in greater detail. The fundamental concept behind ducted lift fans is that they accelerate air downwards to produce the lift needed for vertical takeoff. This lift results from the change in vertical momentum of the airflow that occurs when the airflow, which initially has little or no vertical momentum, accelerates downward at high speed, increasing the vertical momentum.

For solid objects, momentum is simply the mass of the object multiplied by its velocity relative to a reference point. However, for a fluid (e.g., air), momentum is the mass flow rate (e.g., kg or slugs per second) multiplied by the velocity. For the following examples, the VTOL aircraft will be used as the velocity reference point (e.g., either in a static hover, with no airspeed, or at a constant forward speed). The force produced on a given axis is simply the change in momentum of the airflow along that axis.

Figure 3B:
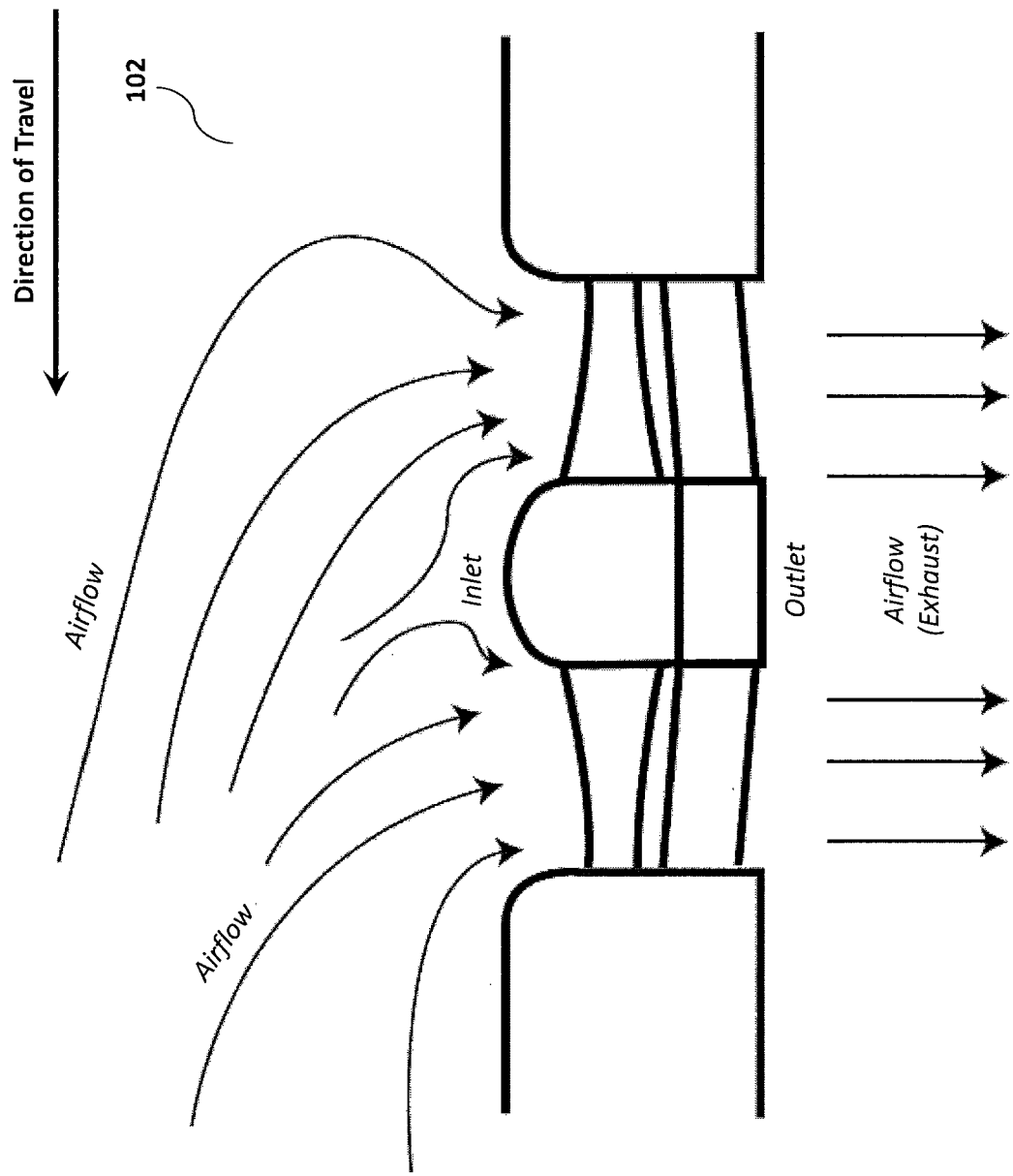

Turning now to FIG. 3a, FIG. 3a shows the airflow (illustrated as arrows) for an example lift fan 102 during hover operation (i.e., zero horizontal speed). The airflow is pulled into the lift fan 102 from a full hemisphere above the lift fan 102. The airflow accelerates as it goes into and through the lift fan 102, and exits straight out the bottom of the lift fan 102. The vertical thrust is the change in vertical axis momentum. Since the initial speed is zero, the vertical lift (or thrust) is simply the mass airflow rate times the exit airflow speed. Conversely, FIG. 3b shows the same lift fan 102, with the aircraft flying horizontally at a relatively high speed, such as it would when transitioning into wing-borne forward flight. Now the airflow that enters the lift fan 102 is coming from the front (nose-end of the aircraft), with an initial airspeed equal to the flight speed of the aircraft. The air is pulled into the lift fan 102, and again exits out the bottom, moving relatively straight out the bottom, as seen in the frame of reference of the moving aircraft. As before, the vertical lift is the change in vertical axis momentum, and since the vertical relative speed of the air is initially zero, the vertical force is the mass airflow rate times the vertical exhaust speed. In this case, however, there is an initial horizontal relative speed of the air, due to the forward speed of the aircraft, but the lift fan 102 and its duct force the airflow to exit nearly vertical, relative to the aircraft, with near zero relative horizontal speed. This change of horizontal speed of the air, and thus a change in horizontal momentum, means there is a force to the aft of the aircraft, i.e., drag. Finally, FIG. 3c shows the same lift fan 102, again with the aircraft flying horizontally at a relatively high speed. However, in this instance, there are deflected vanes 118 under the lift fan 102 that deflect the exhaust airflow stream aft. This reduces the change in horizontal momentum, thereby reducing the drag. However, such vanes 118 have a practical limit with respect to their ability to turn the air, and thus they usually cannot fully eliminate the drag. In practice, the vanes 118 turn the airflow about 30 to 40 degrees, without excessive complexity and/or energy losses.

Assuming the aircraft is in a static hover, with no vertical speed, airflow starts out at rest relative to the aircraft, yielding no momentum. A lift fan 102 may be used to accelerate the air by sucking air from the top of, for example, the wing, and expelling it at high speed out the underside. A characteristic of a ducted lift fan, having a fully subsonic exit flow, is that the air exits the duct at a pressure equal to the ambient pressure, and thus exits in a cylindrical stream tube of constant area. Contrary to a non-ducted rotor (e.g., a propeller), where the wake contracts and increases in speed downstream of the rotor, the airflow speed at a ducted fan exit is equal to the free wake. Therefore, the exit momentum of the air is equal to the mass flow rate at the exit multiplied by the velocity at the exit. Since the pressure at the exit is equal to the ambient pressure, the density of the air would be the same as ambient density, where the airflow rate is equal to the density multiplied by the cross section area of the lift fan exit multiplied by the airflow speed. Assuming a static hover condition, Equation 1 is a suitable equation for fan thrust (T) where ρ is the air density, A is the cross section area of the lift fans, and s is the exit flow speed.

$$T = \rho \times A \times s^2 \qquad \text{Equation 1}$$

The power needed to accelerate the airflow is similar, but can vary as the kinetic energy of the exit flow changes. However, again assuming a static hover condition, there will be zero initial kinetic energy. Thus, Equation 2 is an equation for power (P) where $\dot{m}$ is the mass flow rate and v is the velocity.

$$P = \frac{\dot{m} \times v^2}{2} = \frac{\rho \times A \times v^3}{2} \qquad \text{Equation 2}$$

Using these two relations, it is evident that, for a given thrust (T), high exhaust speeds require high power levels. However, having large cross sectional areas, lower speeds and/or larger mass flows can be used to minimize power consumption. In fact, unlike the higher gas velocities, these lower exhaust speeds can serve the added benefit of minimizing ground erosion. While ground erosion can be problematic for proper runways, it has a more significant impact on a semi-prepared strip and may lead to potential foreign object damage ("FOD") hazards.

Despite the benefits of lift-fan aircraft, an issue remains with respect to the momentum drag generated when the air exiting from the lift fan 102 is directed downward, relative to the aircraft frame of reference. When the aircraft is moving (e.g., when transitioning from hover to forward flight), incoming air typically has a horizontal speed relative to the aircraft. However, the duct around the lift fan 102, particularly the inlet, directs the horizontal airflow to enter the lift fan to be redirected downward. This is mainly from a large suction force on the upstream inlet lip. Thus, the air initially has horizontal momentum relative to the aircraft, but it exits vertically, with no horizontal momentum.

This change in momentum results in a horizontal force toward the back of the aircraft, known as momentum drag—exhibiting forces similar to normal aerodynamic drag. The initial momentum is equal to the forward speed of the aircraft times the mass flow rate. The mass flow rate would be equal to the mass flow exiting the lift fan 102. Thus, Equation 3 represents the equation for momentum drag (D), where S is the forward flight speed of the aircraft.

$$D = \rho \times A \times S^2 \qquad \text{Equation 3}$$

Thus, a lift-to-drag ratio for a lift fan may be defined as lift divided by momentum drag, which, using the above equations, can be reduced to:

$$\text{Ratio} = \frac{FanLift}{D} = \frac{s}{S} \qquad \text{Equation 4}$$

The maximum airspeed that the lift fans 102 need to operate would be equal to the wing-borne speed, where the aircraft is fully supported by its wings and the lift fans 102 can be shut down. This speed may be determined by the aircraft design and its unique mission requirements. For example, an aircraft with a high cruise speed would typically employ a relatively small wing to minimize the cruise drag; however, a small wing would then have a relatively high wing-borne speed. Thus, to minimize momentum drag, a high exit flow speed and a high fan disc loading are desirable. Ironically, this is counter to the above-mentioned goal of a low exit speed and low fan disc loading to reduce hover power and reduce ground erosion.

During transition (e.g., from hover to forward flight or vice versa), as the aircraft speed increases, the amount of lift from the wing also increases and the thrust needed from the lift fans decreases. This can be beneficial because the power needed for the lift fans 102 also decreases, allowing more engine power to be used for forward propulsion. However, a problem remains that traditional methods of reducing lift-fan thrust are to reduce the air velocity through the lift fan 102 by simply decreasing fan RPM, or by decreasing fan blade pitch angle. This lower exit flow speed can mean that the lift fan 102 lift-to-drag ratio also decreases. At the same time, the power required to overcome drag is the flight speed multiplied by the drag force, resulting in a large drag at higher speeds with a large power requirement. The result is that the momentum drag can become quite large, and require large amounts of power to the forward flight thrusters to allow the aircraft to accelerate to fully wing-borne flight.

Thus, a situation arises where the light disc loading lift fans used to reduce hover power are actually causing an increase in the peak power required for takeoff and transition to wing-borne flight. In fact, this peak power may actually be comparable to the peak power needed by a much higher disc-loading fan, rendering the whole effort fruitless.

Thrust reduction of a lift fan 102 may be accomplished by a combination of reducing fan blade pitch angle and/or reducing fan RPM. Thrust reduction may be performed simultaneously for all lift fans 102, or, as described herein, a subset or operation group of the lift fans 102. For example, half thrust for the aircraft may be achieved by operating half of the lift fans 102 of the aircraft at zero throttle, while maintaining the other half of the lift fans 102 at full throttle. Correspondingly, one-quarter thrust could be achieved by operating one quarter of the lift fans 102 at full throttle and remaining three quarters of the lift fans 102 at zero throttle. Intermediate values are also contemplated and could be obtained by operating some lift fans 102 at zero throttle, some at full throttle, and a nominal amount (e.g., one or two) of lift fans 102 at an intermediate, partial throttle. Thus, the lift fans 102 can be controlled independently, but allocated and operated as separately controllable operation groups (i.e., one or more lift fans per operation group).

Operating a lift fan 102 at zero throttle may be accomplished by shutting off the lift fan 102 (e.g., no longer supplying power/fuel to the lift fan 102 such that is not driven) or otherwise adjusting the lift fan 102 such that it no longer provides vertical thrust (e.g., by adjusting the fan blade pitch angle to 0 degrees). A processor-based controller may be programmed to operate the various lift fans 102 and vanes 118 (as applicable) in accordance with programming instructions (e.g., software) to achieve a desired total thrust and to allocate the lift fans 102 to one of the separately controllable operation groups. An example programmable controller for performing the various processes and flight-control techniques disclosed herein is described above and by the '254 patent.

In other words, the momentum drag and power required may be reduced by maintaining only a preset number/subset of lift fans (an operation group) at a continuous full throttle setting, thereby only reducing the throttle on a smaller number of the lift fans 102 (e.g., another operation group of one or two of the lift fans 102), and having any remaining fans fully shut down (e.g., an operation group where the lift fan(s) 102 will be off). The lift fans 102 to be throttled back (e.g., have their power reduced), or shut off, may be selected in a manner that trims the pitching and rolling movements of the aircraft (e.g., in accordance with the controller). For example, depending on the layout of lift fans, a front left fan and a back right fan may be shut down, thus maintaining zero moments about the center of mass of the aircraft.

To illustrate the beneficial results from the above-mentioned techniques, a number of tests were performed and evaluated using a VTOL aircraft performance simulation. For the following analysis, a number of relations and assumptions were established. First, at hover, all of the lift will be generated from the lift fans. Second, the lift fans for each test have a specified disc loading value—the total fan thrust divided by the disc area of the lift fan, as measured at full throttle for each fan. However, the disc loading value could be varied to show different cases for different aircraft. Third, the lift-fan thrust and power was calculated according to the equations described above, but may differ for different disc loadings because the calculation is based on the actual fan thrust required at that instant in the flight. Fourth, the aircraft has at least one wing that operates a constant lift coefficient throughout the transition from hover mode to wing-borne flight. For instance, at the wing-borne speed, the wings, and not the lift fans 102, carry all of the lift. The wing lift will also vary as the square of the airspeed (i.e., constant lift coefficient). Similarly, since the lift coefficient CL is constant, the drag coefficient is constant (i.e., the aerodynamic lift-to-drag ratio is constant), thus the basic aerodynamic drag coefficient is also constant.

For purposes of this analysis, the wing-borne speed was set to 100 knots for each aircraft and the aerodynamic lift-to-drag ratio was set at 6:1. While these values may be low for a cruising aircraft, a transitioning VTOL aircraft tends to have open doors and other drag-increasing devices exposed. As the wing lift increases with increasing speed, the lift fan 102 throttle may be reduced, such that the total lift is constant but wherein the lift fans 102 are operated via their separately controllable groups.

When using a single group, as in prior attempts, the thrust of all fans must be simultaneously reduced by the same fraction. However, as disclosed herein, multiple fans may be combined into multiple separate groups, such that as the required thrust is reduced. For example, the various lift fans 102 (e.g., those illustrated in FIGS. 1 and 2) can be controlled independently to adjust pitching and rolling movements of the aircraft. In certain aspects, some of the lift fans 102 (e.g., a subset of the total number of lift fans 102 may be arranged into independently controllable groups of lift fans 102.

Using this arrangement, one group (e.g., a first operation group of lift fans 102) may be kept at full throttle (e.g., full power), one group (e.g., a second operation group of lift fans 102) may be proportionally throttled down (e.g., as wing-borne lift increases, fan power decreases), and another group (e.g., a third operation group of lift fans 102) may be fully shut down (e.g., at zero throttle). During operation, the number of lift fans 102 operated in, or as part of, an operation group may adjusted. In other words, one or more lift fans 102 may be operationally reallocated from one operation group to another operation group to achieve a desired total thrust or thrust profile (e.g., pitch, trim, etc.). For instance, when transitioning from hover to wing-borne flight, all groups of fans may be initially at full throttle. At mid-transition, each group of fans may have a different throttle level, and at the end (e.g., wing-borne flight), all groups of fans are in the fully shut-down group.

For the following analysis, eight fan groups were considered. The power required for each fan group was calculated according to the previously described methods. Similarly, the momentum drag of the lift fans was calculated according to the previously described methods. As expected, in the case of multiple fan groups, each group was calculated separately. As described above, the lift fans 102 may be constant RPM with variable pitch to change the throttle, or they may be fixed pitch with variable RPM. The only requirement is that each group of fans can be controlled independently of other groups. The lift fan groups may be arranged on the aircraft in whatever locations the designer deems appropriate for the best packaging, power distribution, attitude control and safety.

For this calculation, the airflow is understood to exit from the outlet of the lift fans moving vertically in the frame of reference of the aircraft. Turning vanes 118 were not used in the analysis; however, the use of turning vanes 118 will be discussed below. The aircraft was set to accelerate at a constant rate throughout the transition where thrust was produced as required to achieve this acceleration. Thus, the net thrust after subtracting all drag is constant. Due to the large variation in total power versus flight speed during transition, constant acceleration may not always be the case, but it provides a simplified calculation for the purpose of this analysis, and the results can still be realistically compared and applied to other cases.

For purposes of this analysis, a transition time of 30 seconds was used for all cases. While other methods may be used, ducted thrust fans were used to produce the horizontal thrust for propelling the aircraft. The disc area of the lift fans 102 was set to 20% of the area of all the lift fans—a realistic value based on prior designs, such as the aircraft of FIG. 2.

An advantage of thrust fans, for this analysis, is that they require input shaft power, so it is easy to combine the thrust fan power with lift-fan power to obtain total engine power. The thruster fan analysis uses a similar type of mass flow, momentum, and energy analysis as described previously for lift fans. However, the thrust fan analysis includes the effect of the flight speed, which is not a zero initial flow energy and momentum. As the forward thrust requirement is increased for a given airspeed, the shaft power required increases faster than linearly due to the increase in fan disc loading. Each of the lift fans 102 is assumed to have 100% energy conversion efficiency—the ability of the lift fan 102 to convert shaft power into energy in the lift fan exit flow. While a 100% energy conversion may not be possible, it is consistent in all the comparative analysis.

The lift fans and thrust fans have similar conversion efficiency, so the efficiency can be applied to the total power with reasonable accuracy. Thus, it is reasonable to do this analysis without factoring in fan conversion efficiency.

All analyses were done at sea-level air density. At higher altitudes, even more power would be needed, and the engine power is reduced, so an even greater increase in engine size would be needed. Additional power and thrust would also be needed to allow for trim and maneuver margins. However, an objective of this analysis is to merely demonstrate the advantages of the present disclosure as compared to the prior art as the analysis could apply equally to all the cases.

Figure 4:
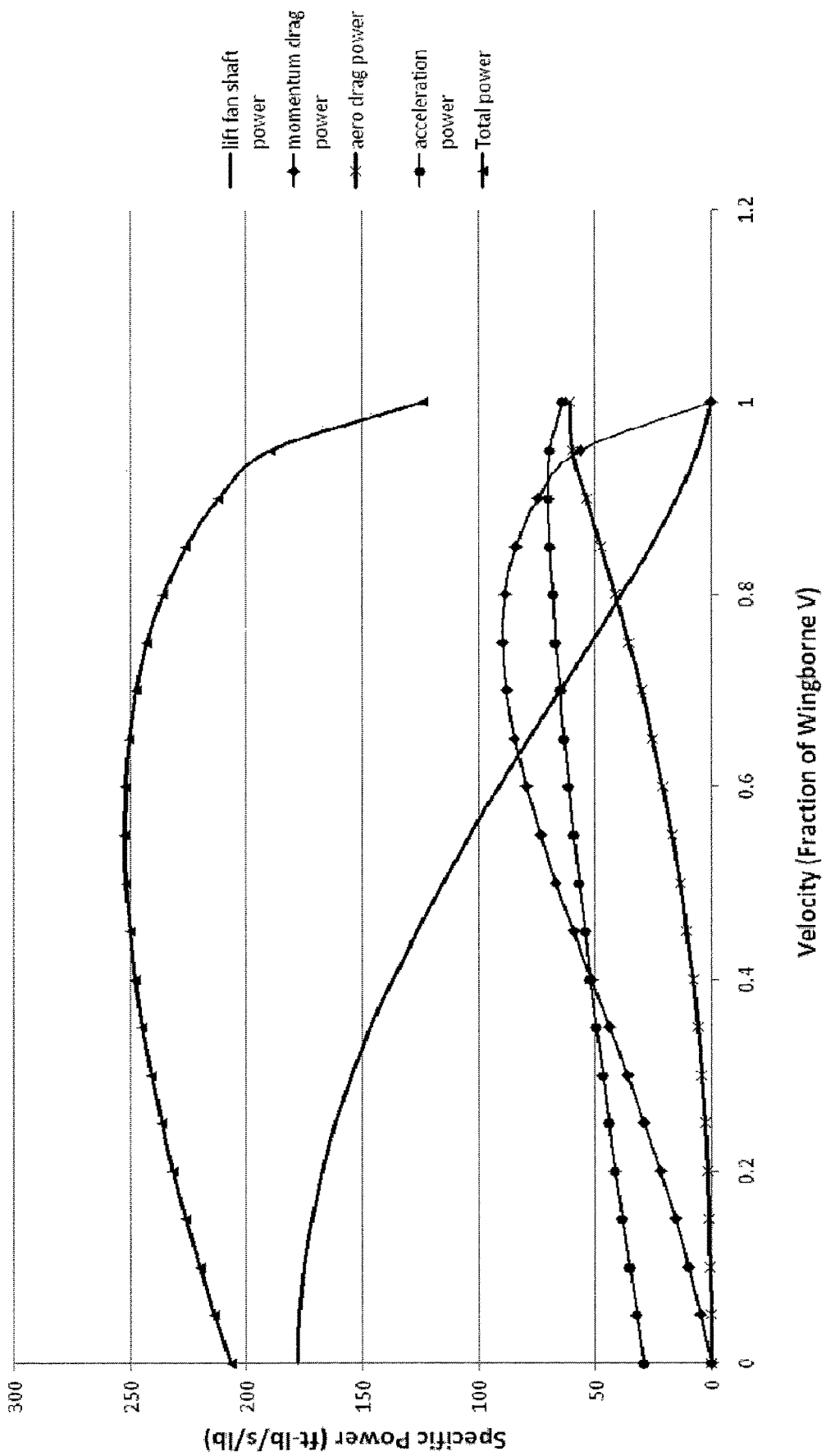
FIG. 4 illustrates a graph of the transitional power requirements of a high disc loading lift-fan aircraft.

Referring now to FIG. 4, a graph of the transitional power requirements of a high disc loading lift-fan aircraft is shown. The graph represents an aircraft having a high disc loading, 300 psf, comparable to the XV-5 of FIGS. 1a and 1b. As seen in the graph, the hover lift-fan shaft power is very high, about 177 ft-lb/s/lb (0.322 hp/lb) and the initial transition thrust, with acceleration power, is somewhat higher at about 203.5 ft-lb/s/lb (0.37 hp/lb).

The peak power requirement occurs when the lift-fan power is still large, while the momentum drag is near peak, at 50% of wing-borne speed. As seen in the graph, this power level is equal to about 256.85 ft-lb/s/lb (0.467 hp/lb). For the purpose of this illustration, the power values do not take into account fan or drivetrain efficiency losses. Therefore, the actual power values would be even higher and even more power margin is needed to provide for aircraft control (e.g., a peak power could be over 400 ft-lb/s/lb).

Figure 5:
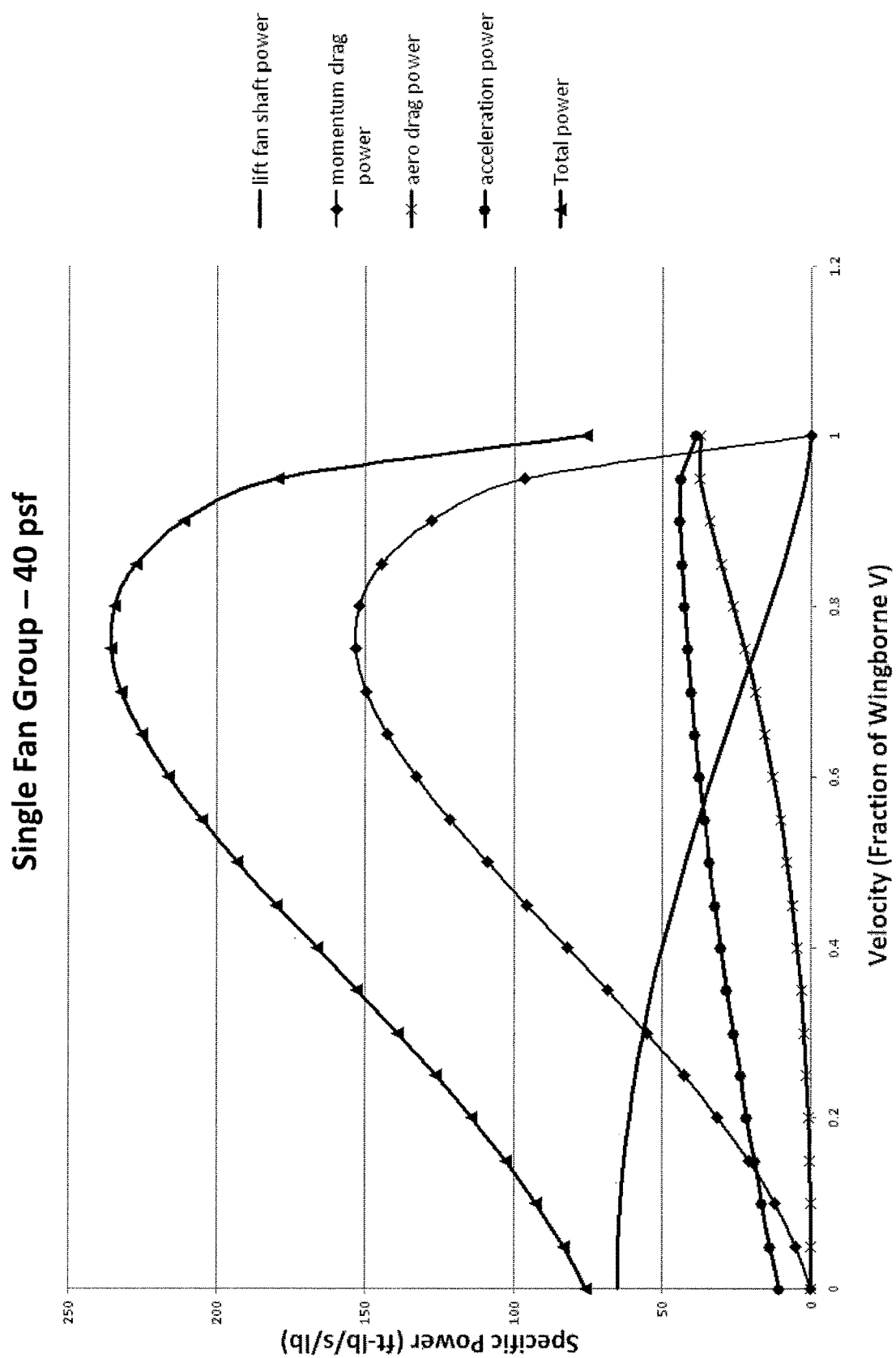
FIG. 5 illustrates a graph of the transitional power requirements of low disc loading lift-fan aircraft using fan throttling methods.

Referring now to FIG. 5, a graph of the transitional power requirements of a low disc loading lift-fan aircraft using traditional fan throttling methods is illustrated. The graph represents an aircraft having a low disc loading, 40 psf, with all fans being throttled together as a single group. Using Equation 2, it is evident that reducing the disc loading by decreasing the area A will result in a lower power requirement P. While the hover lift-fan power is greatly reduced, about 60 ft-lb/s/lb (0.11 hp/lb), roughly ⅓ of the high disc loading equivalent illustrated in FIG. 4, the momentum drag is now much larger. For instance, the peak power now occurs at 75% of wing-borne speed and is 234.3 ft-lb/s/lb (0.426 hp/lb), which is about 91% of the first case, significantly worse than the reduction in hover power.

Figure 6:
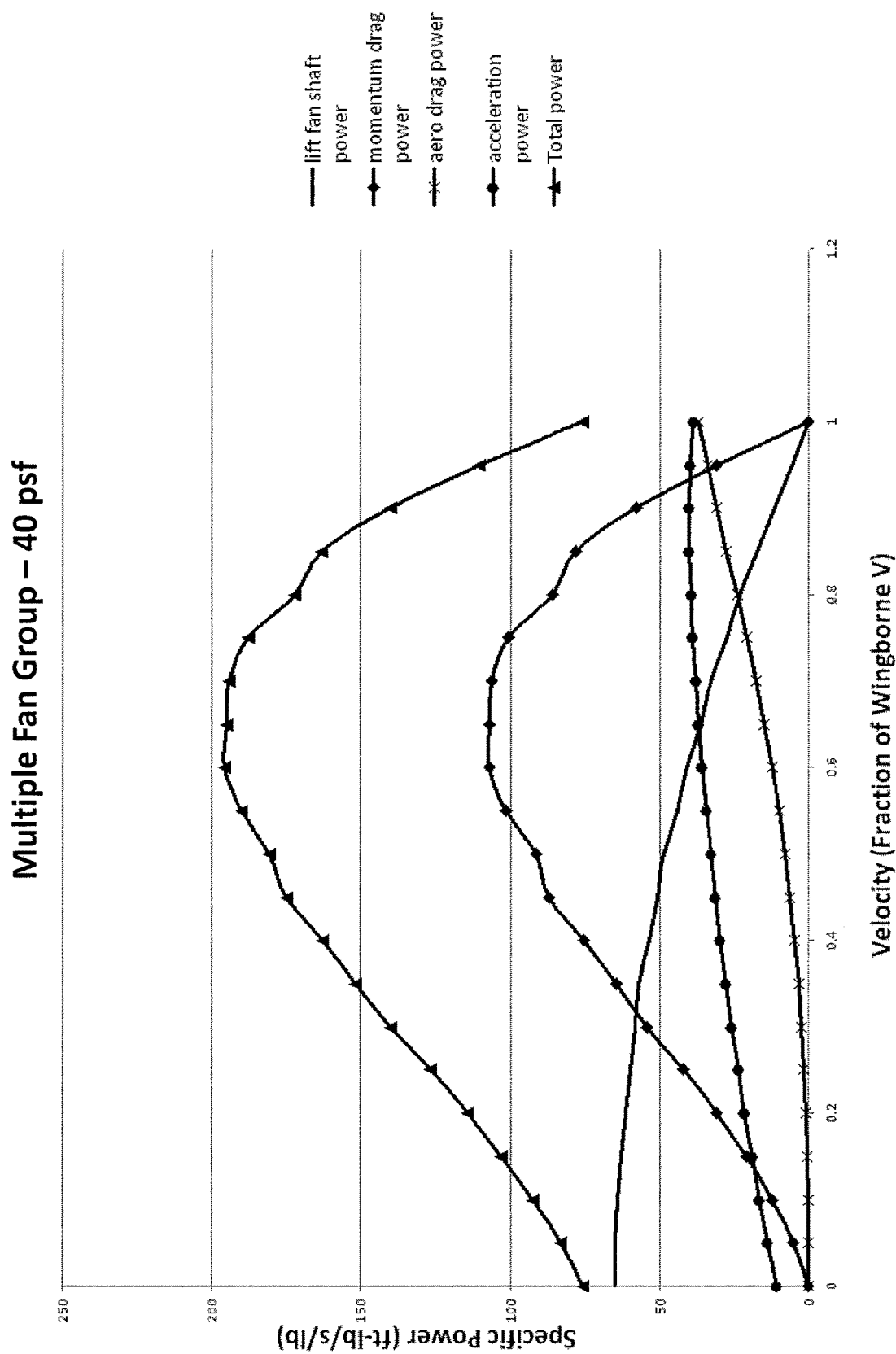
FIG. 6 illustrates a graph of the transitional power requirements using the systems and methods of an embodiment of the present disclosure.

Referring now to FIG. 6, a graph of the transitional power requirements using the systems and methods of an embodiment of the present disclosure is shown. The graph represents an aircraft having a low disc loading, 40 psf, with fans arranged and controlled in eight separate groups in accordance with the present disclosure. While a low disc loading of 40 psf was used in this demonstration, other low disc loading values may be used. The lower the disc loading in hover, the greater the advantages of the present disclosure.

While the hover power is the same as the case shown in FIG. 5, 60.5 ft-lb/s/lb (0.11 hp/lb), the reduction in momentum drag causes the peak power to now occur at a much lower airspeed, 60% of wing-borne speed, similar to the high disc loading case of FIG. 4; wherein the peak power level is now 195.8 ft-lb/s/lb (0.356 lb/hp), or 83% of case of FIG. 5, and 76% of the high disc loading case shown in FIG. 4. In this analysis, only one of the eight groups of lift fans was at partial throttle at any given time. The remainder were either full throttle or shut off. For example, to obtain a fan thrust of 55% of hover thrust, four of the eight groups were at full throttle (50% of hover thrust), three groups were shut off and the remaining group was at 40% throttle (0.05/0.125).

Figure 7:
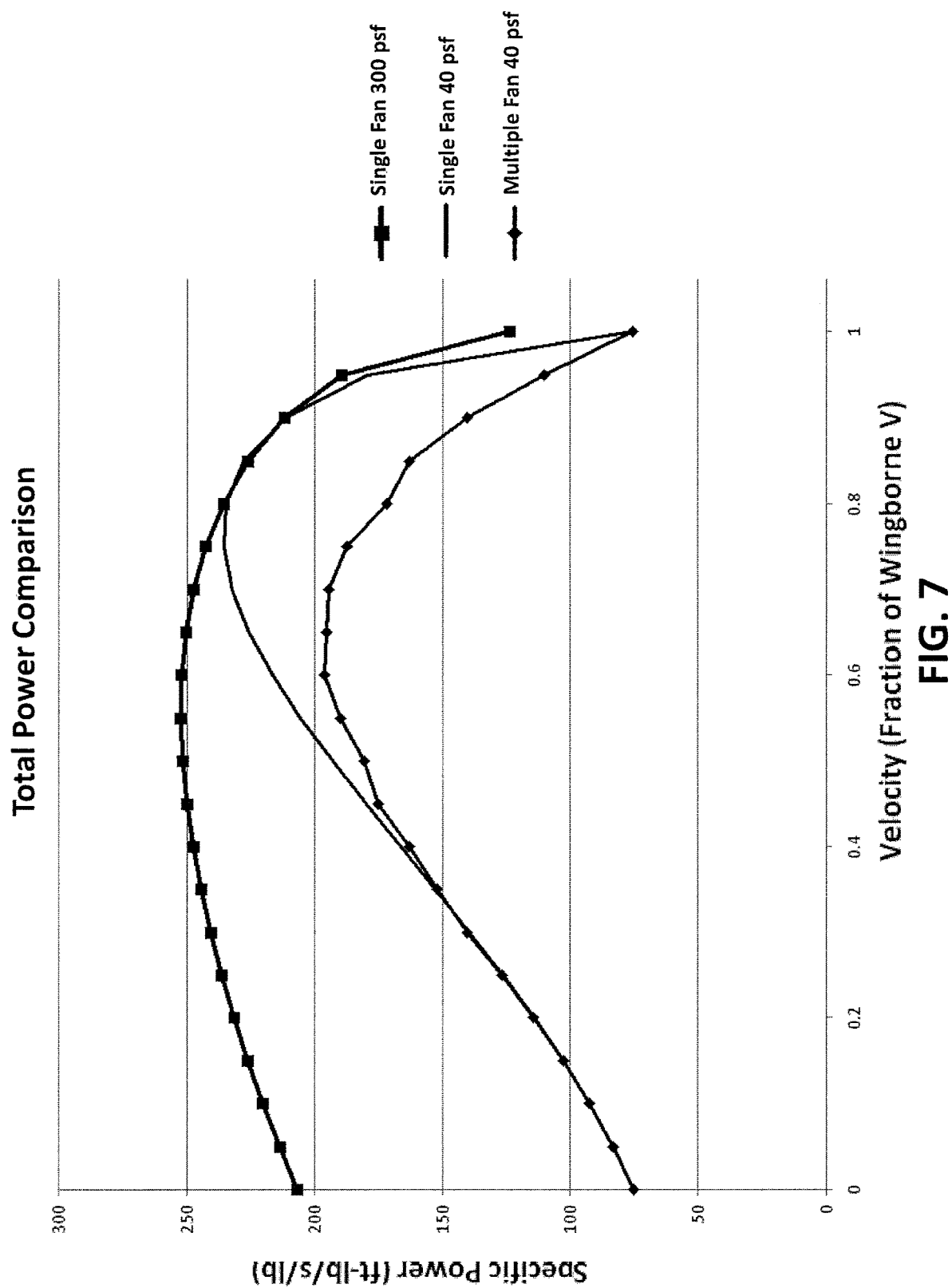
FIG. 7 illustrates an overlay comparison of the total power curves from FIGS. 5 through 6.

Referring now to FIG. 7, an overlay comparison of the total power curves from FIGS. 4, 5, and 6 is shown. The chart clearly shows that arranging the lift fans into multiple groups of independently controlled fans with a low disc loading (i.e., 40 psf) yields a 17% reduction in the peak power compared to the traditional singular lift-fan group having the same disc loading. Even more remarkable is the 24% reduction in the peak power compared to the traditional singular lift-fan group having a high disc loading (i.e., 300 psf).

Several factors help determine the procedure for throttling back or shutting down a lift-fan as the airspeed (and thus wing lift) increase during transition to forward flight. While this description applies to transitions that occur in straight and level flight, the method may be extended to maneuvering flight paths.

The first factor is that the total vertical force should equal to the weight of the aircraft, thus wing lift plus fan lift should equal weight. One or both of the wing lift or the lift fan thrust may be varied, but the ultimate goal of transition is to end up in fully wing-borne flight, so the fan thrust must be eventually reduced.

A second factor to consider is that the lift created by the lift-fans must be distributed across the aircraft such that the total moment about the pitch axis is zero. Accordingly, a reduction of lift on fans or surfaces ahead of the center of mass must be balanced by a reduction of lift aft of the center of mass. Otherwise, the aircraft will pitch.

Third, and similarly, the total moments about the roll axis should also be zero. Accordingly, a reduction on the left side must be balanced by a reduction on the right side.

On lift-fan VTOL vehicles, it can be difficult to maintain trim and control at low to medium speeds (10% to 50% of wing-borne airspeed). The amount of lift and control moment available from the forward flight control surfaces is minimal. Moreover, there can be large upsetting moments due to aerodynamic interactions, both fan-to-fan (a fan downstream of another fan has reduced lift) and fan-to-wing (where a fan flow can either increase or decrease the lift of a nearby wing or stabilizer).

As was shown in the prior momentum drag analysis, only a small amount of power is needed to overcome momentum drag at low speeds. The drag itself is proportional to flight speed/fan exhaust speed, so it is small at low forward speeds. In addition, the power needed to overcome drag is drag times velocity, so low velocity means low power required. This means that at low speed, it is reasonable to throttle all the lift fans 102 in whatever way is best to maintain control of the aircraft, and reduction of drag is only a minor factor, so, it is likely that all fans will be operating at partial thrust at low speed.

However, as the power analysis shows, the power required to overcome momentum drag is very large at higher speeds, such as 50 to 90% of wing-borne speed. At these speeds, the aerodynamic control surfaces have substantial authority, and the wing can produce almost enough lift to support the airplane. Thus, it is now reasonable to control the lift fans 102 according to the methods disclosed herein. The various lift fans can be operated either at full throttle, or shut down as rapidly as possible, thus minimizing the peak transition power required. The wing lift can be easily adjusted to compensate for the sudden variations in total fan lift.

Notably, there are no apparent drawbacks or required hardware modifications apart from software required to implement the system and method. Accordingly, there is minimal expense involved in employing the power-efficient method, wherein the lift fans 102 are combined into separately controllable groups.

As those skilled in the art will know, lift-fan aircraft may use vanes 118 (e.g., turning vanes 118) underneath the lift fans. Lift fans may have adjustable vanes 118 to direct the lift fan exhaust flow aft, thereby providing thrust and reducing drag. In general, the vanes 118 are in the vertical position when hovering, but can rotate to turn the lift-fan flow aft and to provide the desired thrust for transition. If the vanes 118 turn the airflow, such that the aft component of the velocity equals the flight speed, then the momentum drag is exactly cancelled.

As mentioned, vanes 118 were not included in the above analysis because they can add unnecessary complexity, both in the calculations, but also in the determination of the way the vane angles and throttle settings are changed as the airspeed varies. Thus a proper comparison including vanes 118 would require determining the optimal combination of vane angles and throttle settings for each fan group, for each airspeed in the transition.

However, this complexity is not needed to show the merits of the present disclosure. For instance, the turning vanes 118 have a limit in how much they can turn the airflow without large losses. For practical vanes 118, the limit is around 35 to 40 degrees. For the high disc loading case, the lift fan exhaust speed is about 355 ft/second. With 35 degree turning, this gives an aft component of about 200 ft/sec, which is greater than the 100 knot (169 ft/sec) wing-borne speed. Thus, the momentum drag can be fully compensated.

In practice, the power required by an aircraft like this would be nearly constant throughout the transition region, but the details depend on the exact forward propulsion system, and how power is allocated to the various systems and the scheduling of both lift-fan throttle and turning vane angles.

For the case of a light loading fan, such as the 40 psf fans in the above example, vanes 118 can be useful, but are not as effective as at high disc loadings. For a 40 psf fan, the hover fan exhaust speed is about 130 feet per second (ft/sec). When turned 35 degrees by vanes 118, the aft component is only 75 ft/sec, or well below the 169 ft/sec wing-borne speed. Thus, the momentum drag is only partly compensated, and thruster power is needed to overcome the remaining drag.

When all fans are throttled back, the result is that the lift fan exhaust speed is reduced, and the aft component would be reduced even more. Thus, very low aft component speed, low vertical component speed, and high power is needed. By keeping operating fans at the highest possible throttle setting, the momentum drag is reduced, as shown in the example, and the thrust available from vanes 118 is increased.

Although various embodiments have been described with reference to a particular arrangement of parts, features, and the like, these are not intended to exhaust all possible arrangements or features, and indeed many other embodiments, modifications, and variations will be ascertainable to those of skill in the art. For instance, although the various embodiments are directed to airfoils, the concepts may be applied to primary wing airfoils, tail airfoils, and other wake-forming aircraft surfaces.

All U.S. and foreign patent documents, and all articles, brochures, and all other published documents discussed above, are hereby incorporated by reference into the Detailed Description.

I claim:

1. A method of operating a propulsion system in a vertical take-off and landing (VTOL) aircraft, the VTOL aircraft having a forward thrust propulsion system and a plurality of ducted lift fans, the method comprising:
   controlling the forward thrust propulsion system to generate a forward thrust during a transition from vertical flight to forward flight;
   selectively allocating, during the transition from vertical flight to forward flight, each of the plurality of ducted lift fans into a first operation group configured to operate at substantially full throttle, a second operation group configured to operate at intermediate throttle, or a third operation group configured to operate at substantially zero throttle,
   wherein:
      each of the plurality of ducted lift fans is configured to be controlled independently, and
      the first operation group, the second operation group, and the third operation group are configured to generate, in aggregate, a first desired thrust as a function of momentum drag; and
   selectively reallocating, during the transition from vertical flight to forward flight, one or more of the plurality of ducted lift fans from one of the first operation group, the second operation group, or the third operation group to a different one of the first operation group, the second operation group, or the third operation group to generate a second desired thrust as a function of momentum drag.

2. The method of claim 1, wherein to generate the first desired thrust, the method further comprises:
   operating each ducted lift fan of the first operation group at full throttle;
   operating each ducted lift fan of the second operation group at intermediate throttle, wherein the intermediate throttle is configured to balance thrust during the transition from vertical flight to forward flight; and
   shutting off each ducted lift fan of the third operation group such that each ducted lift fans of the third operation group operate substantially zero throttle.

3. The method of claim 1, further comprising controlling the forward thrust propulsion system to generate a forward thrust during forward flight.

4. The method of claim 3, further comprising allocating each of the plurality of ducted lift fans to the third operation group during forward flight.

5. The method of claim 1, wherein the second operation group is configured to operate at intermediate throttle by:
   varying a rotation per minute (RPM) of one or more of the ducted lift fans of the second operation group;
   varying a pitch of one or more of the ducted lift fans of the second operation group; or
   a combination thereof.

6. The method of claim 1, wherein the VTOL aircraft has a disc loading value of about 50 pounds per square foot or less.

7. The method of claim 1, further comprising covering all of the ducted lift fans of the third operation group, wherein the covering is configured to decrease aerodynamic drag on the VTOL aircraft.

8. The method of claim 1, further comprising the step of directing a flow of fan exhaust aft of the VTOL aircraft.

9. The method of claim 8, wherein one or more ducted lift fans of the plurality of ducted lift fans include an adjustable vane, and wherein the step of directing airflow of the fan exhaust aft of the VTOL aircraft comprises adjusting one or more of the adjustable vanes of the one or more ducted lift fans.

10. The method of claim 1, wherein the plurality of ducted lift fans comprises six or more ducted lift fans.

11. The method of claim 1, wherein the VTOL aircraft is configured to use a hybrid of turbine thrusting and electric thrusting.

12. The method of claim 11, wherein the forward thrust propulsion system is configured to employ the turbine thrusting and the plurality of ducted lift fans are configured to employ the electric thrusting.

13. The method of claim 1, wherein the selectively reallocating, during the transition from vertical flight to forward flight, one or more of the plurality of ducted lift fans from one of the first operation group, the second operation group, or the third operation group to a different one of the first operation group, the second operation group, or the third operation group to generate a second desired thrust comprises:
 throttling at least one ducted lift fan of the first operation group from substantially full throttle to substantially zero throttle to reallocate the at least one ducted lift fan of the first operation group to the third operation group; and
 maintaining the ducted lift fans of the third operation group at substantially zero throttle.

14. A system for operating a vertical take-off and landing (VTOL) aircraft comprising:
 a forward propulsion system;
 a plurality of ducted lift fans; and
 a controller, wherein the controller is configured to:
  control the forward thrust propulsion system to generate a forward thrust during a transition from vertical flight to forward flight;
  selectively allocate, during the transition from vertical flight to forward flight, each of the plurality of ducted lift fans into a first operation group configured to operate at substantially full throttle, a second operation group configured to operate at intermediate throttle, or a third operation group configured to operate at substantially zero throttle,
  wherein:
   each of the plurality of ducted lift fans is configured to be controlled independently, and
   the first operation group, the second operation group, and the third operation group are configured to generate, in aggregate, a first desired thrust;
  selectively reallocate, during the transition from vertical flight to forward flight, one or more of the plurality of ducted lift fans from one of the first operation group, the second operation group, or the third operation group to a different one of the first operation group, the second operation group, or the third operation group to generate a second desired thrust as a function of momentum drag;
  control the forward thrust propulsion system to generate a forward thrust during forward flight; and
  allocate each of the plurality of ducted lift fans to the third operation group during forward flight.

15. The system of claim 14, wherein to generate the first desired thrust, the controller is configured to:
 operate each ducted lift fan of the first operation group at full throttle;
 operate each ducted lift fan of the second operation group at intermediate throttle, wherein the intermediate throttle is configured to balance thrust during the transition from vertical flight to forward flight; and
 shut off each ducted lift fan of the third operation group such that each ducted lift fans of the third operation group operate substantially zero throttle.

16. The system of claim 14, wherein the second operation group is configured to operate at intermediate throttle by:
 varying a rotation per minute (RPM) of one or more of the ducted lift fans of the second operation group;
 varying a pitch of one or more of the ducted lift fans of the second operation group; or
 a combination thereof.

17. The system of claim 14, wherein the VTOL aircraft has a disc loading value of about 50 pounds per square foot or less.

18. The system of claim 14, wherein all of the ducted lift fans of the third operation group are covered to decrease aerodynamic drag on the VTOL aircraft.

19. The system of claim 14, wherein one of more ducted lift fans of the plurality of ducted lift fans comprise one or more adjustable vanes, and wherein the controller is further configured to adjust one or more of the adjustable vanes to direct a flow of fan exhaust aft of the VTOL aircraft.

20. The system of claim 14, wherein the VTOL aircraft is configured to use a hybrid of turbine thrusting and electric thrusting.

* * * * *